US009438135B2

(12) United States Patent
Kinoshita

(10) Patent No.: US 9,438,135 B2
(45) Date of Patent: Sep. 6, 2016

(54) ELECTRIC POWER CONVERTER INCLUDING A STABILIZATION CIRCUIT

(75) Inventor: Masahiro Kinoshita, Minato-ku (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 195 days.

(21) Appl. No.: 13/879,937

(22) PCT Filed: Jan. 7, 2011

(86) PCT No.: PCT/JP2011/050141
§ 371 (c)(1),
(2), (4) Date: Apr. 17, 2013

(87) PCT Pub. No.: WO2012/093486
PCT Pub. Date: Jul. 12, 2012

(65) Prior Publication Data
US 2013/0208518 A1    Aug. 15, 2013

(51) Int. Cl.
*H02M 1/12*    (2006.01)
*H02M 1/14*    (2006.01)
*H02M 7/537*    (2006.01)
*H02M 5/458*    (2006.01)
*H02M 7/5387*    (2007.01)

(52) U.S. Cl.
CPC ............. *H02M 7/537* (2013.01); *H02M 1/14* (2013.01); *H02M 5/458* (2013.01); *H02M 7/53871* (2013.01)

(58) Field of Classification Search
CPC .... H02J 3/16; H02M 7/537; H02M 7/53871; H02M 1/14; H02M 5/458

USPC ........... 363/28, 87, 58, 40, 132, 37, 136, 17, 363/71, 128, 68, 160, 54, 96
See application file for complete search history.

(56) References Cited

U.S. PATENT DOCUMENTS 4,480,298 A * 10/1984 Fry .................................. 363/28
5,550,697 A *  8/1996 Green ............... H02M 7/53871
                                                    361/18

(Continued)

FOREIGN PATENT DOCUMENTS

CN         1279532 A     1/2001
CN       101803162 A     8/2010

(Continued)

OTHER PUBLICATIONS

Office Action issued Jun. 27, 2014 in Korean Patent Application No. 10-2013-7009277 (with English language translation).

(Continued)

*Primary Examiner* — Jessica Han
*Assistant Examiner* — Lorena Bruner
(74) *Attorney, Agent, or Firm* — Oblon, McClelland, Maier & Neustadt, L.L.P.

(57) ABSTRACT

An electric power converter includes a DC stabilization circuit configured to stabilize a DC voltage from DC power supply, and an inverter configured to convert the DC voltage stabilized by the DC stabilization circuit to an AC voltage. The DC stabilization circuit includes an aluminum electrolytic capacitor configured to smooth the DC voltage, a saturable reactor configured to prevent the DC stabilization circuit from oscillating, and a film capacitor configured to supply a ripple current to the inverter.

5 Claims, 3 Drawing Sheets

(56) References Cited

U.S. PATENT DOCUMENTS

| | | | | |
|---|---|---|---|---|
| 6,392,907 | B1 * | 5/2002 | Ichikawa | 363/98 |
| 6,984,963 | B2 * | 1/2006 | Pidutti | H02M 1/4225 |
| | | | | 323/207 |
| 7,420,828 | B2 * | 9/2008 | Ishio | H05B 6/08 |
| | | | | 219/663 |
| 7,577,007 | B2 * | 8/2009 | Mori et al. | 363/71 |
| 7,710,747 | B2 * | 5/2010 | Matsumoto | H02M 5/458 |
| | | | | 363/35 |
| 8,446,134 | B2 * | 5/2013 | Manor | H02M 1/14 |
| | | | | 323/222 |
| 8,547,073 | B2 * | 10/2013 | Fujii | H02M 3/1588 |
| | | | | 323/222 |
| 8,929,110 | B2 * | 1/2015 | Courtel | H02M 3/156 |
| | | | | 323/207 |
| 2003/0038699 | A1 | 2/2003 | Nakatsu et al. | |
| 2005/0052271 | A1 | 3/2005 | Nakatsu et al. | |
| 2011/0127837 | A1 | 6/2011 | Sato et al. | |
| 2011/0170322 | A1 | 7/2011 | Sato et al. | |
| 2012/0275201 | A1 * | 11/2012 | Koyama | H02M 1/126 |
| | | | | 363/40 |

FOREIGN PATENT DOCUMENTS

| | | | | |
|---|---|---|---|---|
| JP | 2 65088 | | 5/1990 | |
| JP | 3 277180 | | 12/1991 | |
| JP | 3277180 A | * | 12/1991 | |
| JP | 2001 16866 | | 1/2001 | |
| JP | 2001-016866 | * | 1/2001 | H02M 7/48 |
| JP | 2002 94348 | | 3/2002 | |
| JP | 2003 143873 | | 5/2003 | |
| JP | 2006 87212 | | 3/2006 | |
| JP | 2010-252535 | * | 4/2010 | H02M 7/48 |
| JP | 2010-252535 A | | 11/2010 | |
| WO | 2009 037782 | | 3/2009 | |

OTHER PUBLICATIONS

International Search Report Issued Feb. 8, 2011 in PCT/JP11/50141 Filed Jan. 7, 2011.

Combined Chinese Office Action and Search Report issued Nov. 3, 2014, in Patent Application No. 201180055887.9 (with English-language translation).

* cited by examiner

ELECTRIC POWER CONVERTER INCLUDING A STABILIZATION CIRCUIT

TECHNICAL FIELD

The present invention relates to an electric power converter, and in particular relates to an electric power converter configured to convert DC power to AC power.

BACKGROUND ART

Generally, an electric power converter configured to convert DC power to AC power is provided with a capacitor configured to stabilize a DC voltage from DC power supply and an inverter configured to convert the DC voltage stabilized by the capacitor to an AC voltage. In the inverter, a ripple current occurs along with a switching operation of a semiconductor switching element. The ripple current occurred in the inverter is absorbed by the capacitor (for example, see Japanese Patent Laying-Open No. 2006-87212 (PTL 1)).

CITATION LIST

Patent Literature

PTL 1: Japanese Patent Laying-Open No. 2006-87212

SUMMARY OF INVENTION

Technical Problem

In such electric power converter, an aluminum electrolytic capacitor is generally used as the capacitor. The aluminum electrolytic capacitor has an advantage of a greater capacitance value and meanwhile a disadvantage of a lower supply capability (absorption capability) for the ripple current. Thereby, in order to supply the ripple current which is needed by the inverter, it is necessary to use a plurality of aluminum electrolytic capacitors connected in parallel, which makes the device larger in size and higher in cost.

Since the ripple current is an AC current of high frequency, the fact that the ripple current occurred in the inverter is absorbed by the capacitor is equivalent in meaning to the fact that the ripple current is supplied from the capacitor to the inverter.

In such electric power converter, in order to supply the ripple current from the capacitor to the inverter, it is necessary to dispose the capacitor and the inverter in proximity to each other so as to minimize an inductance component of a wire between the capacitor and the inverter. Thereby, there comes a problem that the design flexibility of the device will be limited.

It is, therefore, a principal object of the present invention to provide an electric power converter capable of achieving a reduced size, a low cost and a great design flexibility thereof.

Solution to Problem

An electric power converter according to the present invention is an electric power converter configured to convert DC power to AC power and includes a DC stabilization circuit configured to stabilize a DC voltage from DC power supply and an inverter configured to convert the DC voltage stabilized by the DC stabilization circuit to an AC voltage. The DC stabilization circuit includes an input terminal configured to receive the DC voltage from the DC power supply, a DC output terminal connected to the inverter, a power storage device connected to the input terminal and configured to smooth the DC voltage of the input terminal, a reactor having one terminal connected to the input terminal and the other terminal connected to the DC output terminal and being configured to prevent the DC stabilization circuit from oscillating, and a film capacitor connected to the DC output terminal and configured to supply a ripple current to the inverter.

Preferably, the power storage device is an electrolytic capacitor.

Preferably, the power storage device is an electric double layer capacitor.

Preferably, the power storage device is a battery.

Preferably, the power storage device is a saturable reactor.

Preferably, the DC stabilization circuit further includes a fuse interposed between the input terminal and the one terminal of the reactor.

Advantageous Effects Of Invention

In the electric power converter according to the present invention, the DC voltage is smoothed by the power storage device, the ripple current is supplied by the film capacitor, and the oscillation is prevented by the reactor. Thereby, it is unnecessary for the power storage device to supply the ripple current, which makes it sufficient to use the power storage of a small size and low cost. Moreover, only the film capacitor is needed to be disposed adjacent to the inverter and the power storage device can be disposed distant from the inverter; thereby, it can be expected to increase the design flexibility and reduce the size of the inverter.

DESCRIPTION OF EMBODIMENTS

Figure 1:
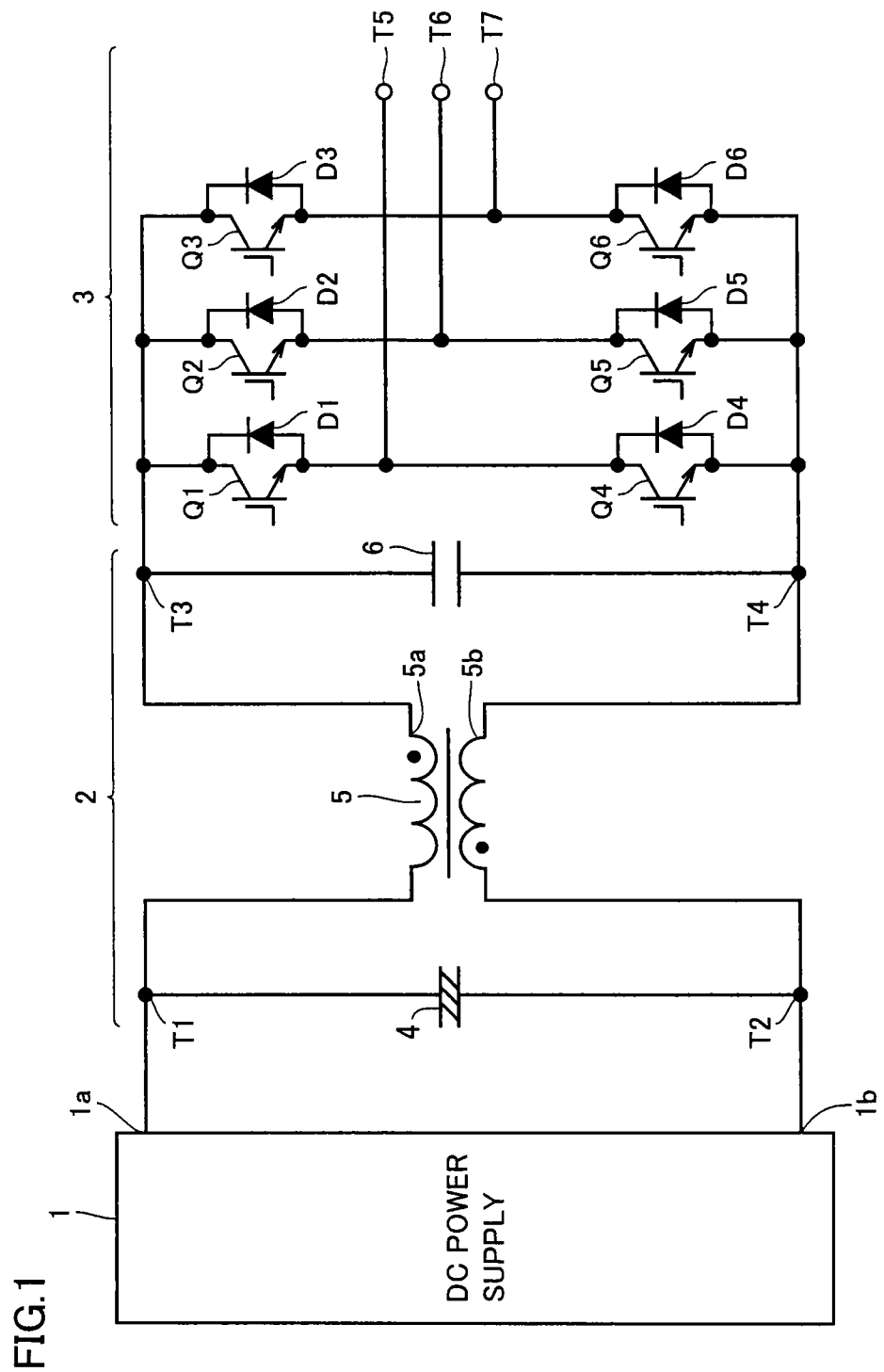
FIG. 1 is a circuit block diagram illustrating a configuration of an electric power converter according to an embodiment of the present invention.

As illustrated in FIG. 1, an electric power converter according to an embodiment of the present invention is a device configured to convert DC power supplied from DC power supply 1 to AC power, and is provided with a DC stabilization circuit 2 and an inverter 3.

DC power supply 1 is a device supplying the DC power, for example, a converter converting the AC power to the DC power. It is acceptable that DC power supply 1 is a rectification circuit rectifying an AC voltage, a battery stored with the DC power, or a photovoltaic cell or a fuel cell generating the DC power.

DC stabilization circuit 2 is a circuit which is configured to stabilize a DC voltage from DC power supply 1, and includes input terminals T1 and T2, DC output terminals T3 and T4, an aluminum electrolytic capacitor 4, a saturable reactor 5, and a film capacitor 6.

Input terminals T1 and T2 are connected respectively to a positive-side output terminal 1a and a negative-side output terminal 1b of DC power supply 1 and receive the DC voltage output from DC power supply 1. Aluminum electrolytic capacitor 4 is connected between input terminals T1 and T2 and is charged by the DC voltage from DC power supply 1. The DC voltage output from DC power supply 1 is smoothed by aluminum electrolytic capacitor 4. As mentioned above, aluminum electrolytic capacitor 4 has an advantage of a greater capacitance value and meanwhile a disadvantage of a lower supply capability (absorption capability) for the ripple current.

Film capacitor 6 is connected between DC output terminals T3 and T4. Film capacitor 6 has advantages of a higher supply capability and a longer operation life and meanwhile a disadvantage of a smaller capacitance value. Since film capacitor 6 is unsuitable to be used as a DC smoothing capacitor due to a smaller capacitance value, and is also unsuitable to be used as a backup capacitor in a momentary voltage drop or the like due to a smaller energy capacitance. In order to obtain a greater capacitance value, it is necessary to use a plurality of capacitors connected in parallel, which makes the device larger in size and higher in cost.

Figure 2:
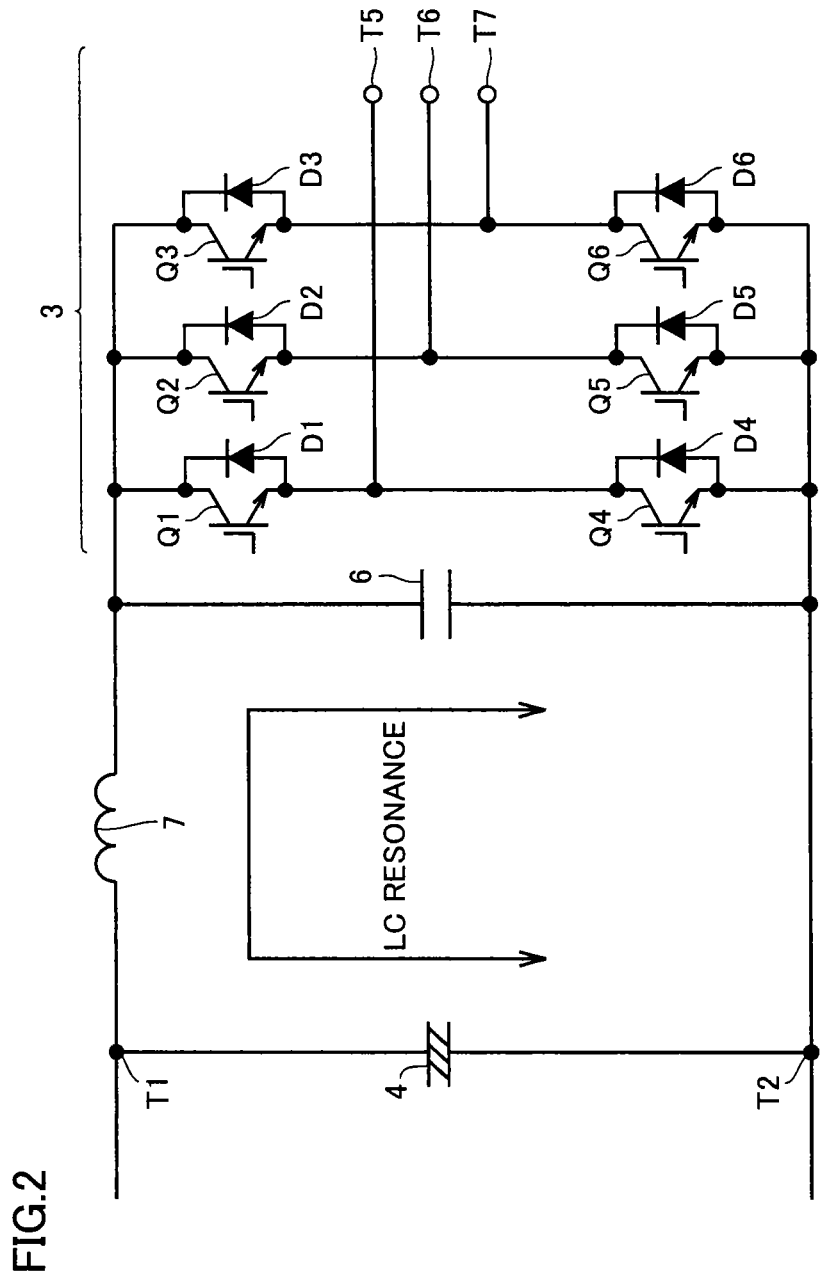
FIG. 2 is a circuit diagram for explaining an effect of a saturable reactor illustrated in FIG. 1.

Thereby, in the present invention, both aluminum electrolytic capacitor 4 and film capacitor 6 are used so as to compensate the disadvantage of one with the advantage of the other. However, as illustrated in FIG. 2, in the case that aluminum electrolytic capacitor 4 and film capacitor 6 are simply connected in parallel, a resonance circuit is formed by capacitors 4, 6 and an inductance component of a wire 7 disposed therebetween. If a resonance frequency of the resonance circuit becomes close to a switching frequency of inverter 3, a resonant ripple current will occur to flow in the resonance circuit, which makes capacitors 4 and 6 overheating.

Thereby, in the present invention, as illustrated in FIG. 1, film capacitor 6 is disposed in close proximity to inverter 3, and film capacitor 6 and aluminum electrolytic capacitor 4 are connected with saturable reactor 5 interposed therebetween. Accordingly, it is possible to increase a high-frequency impedance between capacitors 4 and 6, and resultantly to inhibit the resonance phenomenon.

It is possible to perform the supply of the high-frequency ripple current to inverter 3 from film capacitor 6 only and perform the smoothing of the DC voltage in aluminum electrolytic capacitor 4, which makes it possible to design separately the ripple current supply and the DC voltage smoothing.

Since the ripple current flowing through aluminum electrolytic capacitor 4 becomes smaller, it is possible to adopt aluminum electrolytic capacitor 4 with a higher internal resistance but a lower price. Moreover, since film capacitor 6 is small in size, by making smaller an electric power converting section including capacitor 6 and inverter 3, it is possible to dispose aluminum electrolytic capacitor 4 at a position distant from the electric power converting section, and consequently to increase the design flexibility.

Saturable reactor 5 includes two magnetically coupled coils 5a and 5b. One terminal of coil 5a is connected to DC output terminal T3 and the other terminal thereof is connected to input terminal T1. One terminal of coil 5b is connected to input terminal T2 and the other terminal thereof is connected to DC output terminal T4.

A reactance L of saturable reactor 5 varies according to a product V•t of a voltage V applied between the terminals of saturable reactor 5 and a time t, and possesses a constant value when V•t is smaller than a predetermined value but decreases abruptly when V•t exceeds the predetermined value. Thus, reactance L of saturable reactor 5 takes a higher value in the case of a high-frequency voltage and a lower value in the case of a low-frequency voltage and a DC voltage. Thereby, the DC voltage smoothed by aluminum electrolytic capacitor 4 is supplied to inverter 3 through saturable reactor 5, while the high-frequency ripple voltage occurred along with switching operations of inverter 3 will not pass through saturable reactor 5.

Inverter 3 includes IGBTs (Insulated Gate Bipolar Transistors) Q1 to Q6, diodes D1 to D6, and AC output terminals T5 to T7.

26 Collectors of IGBTs Q1 to Q3 are all connected to DC output terminal T3, and emitters thereof are connected respectively to AC output terminals T5 to T7. Collectors of IGBTs Q4 to Q6 are connected respectively to AC output terminals T5 to T7, and emitters thereof are all connected to DC output terminal T4. Diodes D1 to D6 are connected in inverse-parallel to IGBTs Q1 to Q6, respectively. A control circuit (not shown) issues a control signal to each gate of respective IGBTs Q1 to Q6 to switch on or off each of IGBTs Q1 to Q6 at a predetermined timing so as to convert a DC voltage to a three-phase AC voltage.

For example, a three-phase load (such as a three-phase motor) is connected to AC output terminals T5 to T7, by shifting the phase of each IGBT by 60° and switching on each IGBT at 120° each time in the order of Q1, Q6, Q2, Q4, Q3 and Q5, it is possible to supply the three-phase AC voltage to the three-phase load.

In the present embodiment, aluminum electrolytic capacitor 4 is used as the AC smoothing capacitor, the energy storage capacitor and the backup capacitor; however, in place of aluminum electrolytic capacitor 4, it is acceptable to use an electric double layer capacitor or various batteries to achieve the same effects.

It is also acceptable to use a common reactor in place of saturable reactor 5. Even for a common reactor, the impedance of the reactor increases in proportion to frequency, thereby, it is possible to block the high-frequency ripple current by the reactor, which makes it possible to inhibit the occurrence of the resonance phenomenon.

Figure 3:
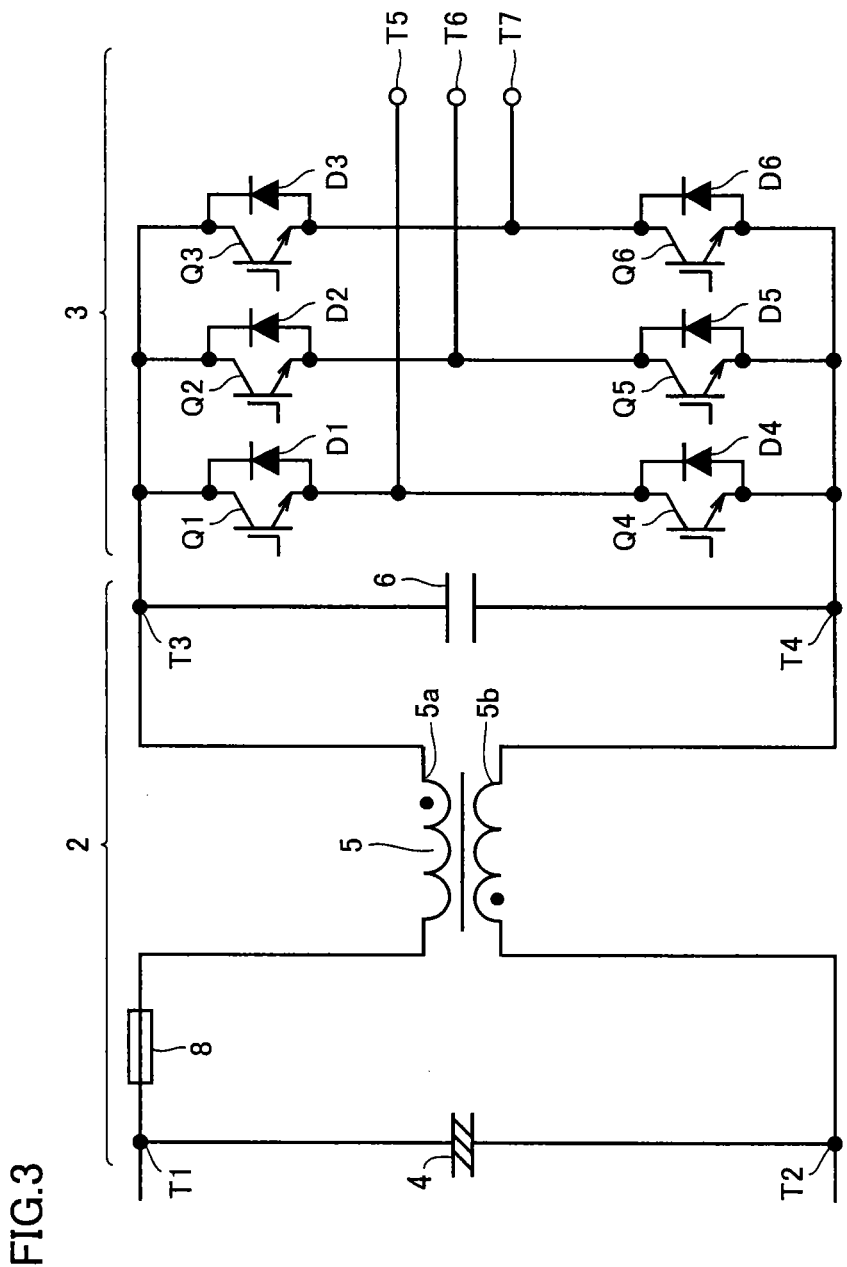
FIG. 3 is a circuit diagram illustrating a modification of an embodiment.

FIG. 3, in comparison to FIG. 1, is a circuit diagram illustrating a modification of the present embodiment. As illustrated in FIG. 3, in the modification, a fuse 8 is added to DC stabilization circuit 2. Fuse 8 is interposed between input terminal T1 and the other terminal of coil 5a in saturable reactor 5. According to the modification, when an IGBT of inverter 3 malfunctions to the short-circuit state, fuse 8 is blown out; thereby, it is possible to alleviate the influences caused by the IGBT short-circuit malfunction. Moreover, since fuse 8 is disposed to have a connection with saturable reactor 5 at the side of aluminum electrolytic capacitor 4, it is possible to easily select fuse 8 without taking into consideration the high-frequency ripple current flowing in fuse 8.

It should be understood that the embodiments disclosed herein have been presented for the purpose of illustration and description but not limited in all aspects. It is intended that the scope of the present invention is not limited to the description above but defined by the scope of the claims and encompasses all modifications equivalent in meaning and scope to the claims.

REFERENCE SIGNS LIST

1: DC power supply; 1a: positive-side output terminal; 1b: negative-side output terminal; 2: DC stabilization circuit; 3: inverter; 4: aluminum electrolytic capacitor; 5: saturable reactor; 5a, 5b: coil; 6: film capacitor; 7: wire; 8: fuse; Q1-Q6: IGBT; D1-D6: diode; T1, T2: input terminal; T3, T4: DC output terminal; T5-T7: AC output terminal

The invention claimed is:
1. An electric power converter configured to convert DC power to AC power, comprising:
   a DC stabilization circuit configured to stabilize a DC voltage from DC power supply; and
   an inverter configured to convert the DC voltage stabilized by said DC stabilization circuit to an AC voltage, said DC stabilization circuit including:
      first and second input terminals configured to receive the DC voltage from said DC power supply;
      first and second output terminals connected to said inverter;
      a smoothing capacitor connected between said first and second input terminals and configured to smooth the DC voltage between said first and second input terminals;
      a saturable reactor connected between said first and second input terminals and said first and second DC output terminals, and configured to prevent said DC stabilization circuit from oscillating; and
      a film capacitor connected between said first and second DC output terminals and configured to supply a ripple current to said inverter, wherein
      said saturable reactor includes a first coil connected between said first DC output terminal and said first input terminal and a second coil connected between said second input terminal and said second DC output terminal, and
      said first and second coils are mutually magnetically coupled.

2. The electric power converter according to claim 1, wherein said smoothing capacitor is an electrolytic capacitor.

3. The electric power converter according to claim 1, wherein said smoothing capacitor is an electric double layer capacitor.

4. The electric power converter according to claim 1, wherein said smoothing capacitor has a capacitance value larger than that of said film capacitor.

5. The electric power converter according to claim 1, wherein said DC stabilization circuit further includes a fuse having one terminal connected to said first input terminal and the other terminal connected via said first coil to said first DC output terminal.

* * * * *